US006795926B1

(12) United States Patent
Matula et al.

(10) Patent No.: US 6,795,926 B1
(45) Date of Patent: Sep. 21, 2004

(54) PREVENTION OF POWER STATE CHANGE IN RESPONSE TO CHASSIS INTRUSION WHEN COMPUTER SYSTEM IS NOT IN POWERED UP POWER STATE

(75) Inventors: Terry L. Matula, Austin, TX (US); John R. Stuewe, Cedar Park, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/322,296

(22) Filed: May 28, 1999

(51) Int. Cl.⁷ .................................................. G06F 1/26
(52) U.S. Cl. ...................................... 713/300; 713/310
(58) Field of Search ................................ 713/300, 310

(56) References Cited

U.S. PATENT DOCUMENTS

| | | | |
|---|---|---|---|
| 3,849,615 A | 11/1974 | Fisher | 200/61.81 |
| 3,940,130 A | 2/1976 | Fawcett | 273/1 E |
| 4,655,634 A | 4/1987 | Loy et al. | 404/84 |
| 4,686,336 A | 8/1987 | Sorenson | 200/61.62 |
| 4,910,634 A | 3/1990 | Pipkorn | 361/147 |
| 5,008,846 A | 4/1991 | Inoue | 364/707 |
| 5,077,631 A | 12/1991 | Cleary | 361/192 |
| 5,115,511 A * | 5/1992 | Nilsson et al. | 713/1 |
| 5,235,532 A | 8/1993 | Sugino | 364/707 |
| 5,237,339 A | 8/1993 | Ichikawa | 346/107 R |
| 5,241,562 A | 8/1993 | Partyka et al. | 375/1 |
| 5,281,857 A | 1/1994 | Keese | 307/115 |
| 5,353,015 A | 10/1994 | Robinson | 340/686 |
| 5,432,309 A | 7/1995 | Takeuchi et al. | 200/61.62 |
| 5,526,493 A | 6/1996 | Shu | 395/281 |
| 5,608,377 A | 3/1997 | Zhevlev et al. | 340/506 |
| 5,619,076 A | 4/1997 | Layden et al. | 307/48 |
| 5,748,084 A | 5/1998 | Isikoff | 340/568 |
| 5,777,834 A | 7/1998 | Lehner et al. | 361/66 |
| 5,821,641 A | 10/1998 | Demo et al. | 307/125 |
| 5,845,136 A | 12/1998 | Babcock | 395/750.01 |
| 5,912,621 A * | 6/1999 | Schmidt | 340/571 |

(List continued on next page.)

OTHER PUBLICATIONS

Winn L. Rosch; *"Winn L. Rosch Hardware Bible, Premier Edition"*; 1997; pp. 1126–1133.

*"Advanced Configuration and Power Interface Specification*: Intel, Microsoft, Toshiba, Revision 1.0"; Dec. 22, 1996; pp. ii–262.

*"PCI Bus Power Management Interface Specification*, Revision 1.1"; Dec. 18, 1998; pp. 1–71.

*"PCI Local Bus Specification: Revision 2.2"*; Dec. 18, 1998; pp. ii, 16, and 116.

Primary Examiner—Lynne H. Browne
Assistant Examiner—Tse Chen
(74) Attorney, Agent, or Firm—Haynes and Boone, LLP

(57) ABSTRACT

A gating circuit for a computer system to prevent a power management signal provided by a computer card slot connector or a system board mounted device to change the power state of the computer system from a lower power state to a higher power state when the chassis of the computer system is open. The computer system includes a chassis intrusion detection switch to provide an indication of whether the chassis is open. In one example, the computer card connector is a card slot connector that conforms to the PCI or AGP computer bus standards, and the power management signal is a PME# signal. The gating circuit also prevents a wake on LAN (WOL) signal received via a jumper from a WOL circuit from changing the power state of the computer system from a lower power state to a higher power state. When the gating circuit receives an indication that the computer system is in a powered up power state, the gating circuit provides a gated power signal to change the power state of the computer system in response to receiving a PME# or WOL signal regardless of whether the chassis is open or closed. The computer system implements a power management strategy such as the Advanced Configuration and Power Interface power strategy. The gating circuit prevents a PME# signal or WOL signal from placing a computer circuit in a higher power state from a non powered up power state during the installation of a computer card in the computer system.

41 Claims, 4 Drawing Sheets

U.S. PATENT DOCUMENTS

| | | | |
|---|---|---|---|
| 6,148,418 A | * 11/2000 | Wang et al. | 714/25 |
| 6,199,123 B1 | * 3/2001 | Simonich et al. | 710/36 |
| 6,269,288 B1 | * 7/2001 | Smith | 700/295 |
| 6,275,933 B1 | * 8/2001 | Fine et al. | 713/2 |
| 6,282,666 B1 | * 8/2001 | Bays et al. | 713/323 |
| 6,351,819 B1 | * 2/2002 | Berglund et al. | 713/310 |
| 6,360,327 B1 | * 3/2002 | Hobson | 713/300 |
| 6,601,178 B1 | * 7/2003 | Gulick | 713/322 |

* cited by examiner

PREVENTION OF POWER STATE CHANGE IN RESPONSE TO CHASSIS INTRUSION WHEN COMPUTER SYSTEM IS NOT IN POWERED UP POWER STATE

BACKGROUND

This disclosure relates in general to a computer system and more specifically to controlling a change in the power state of computer system.

Computer systems are information handling systems which can be designed to give independent computing power to one user or a plurality of users. Computer systems may be found in many forms including, for example, mainframes, minicomputers, workstations, servers, personal computers, internet terminals, notebooks, and embedded systems. Computer systems include desk top, floor standing, rack mounted, or portable versions. A typical computer system includes at least one system processor, associated memory and control logic, and a number of peripheral devices that provide input and output for the system. Such peripheral devices may include display monitors, keyboards, mouse-type input devices, floppy and hard disk drives, CD-ROM drives, printers, network capability card circuits, terminal devices, modems, televisions, sound devices, voice recognition devices, electronic pen devices, and mass storage devices such as tape drives, CD-R drives, or DVDs.

Attempts by the computer industry to reduce the amount of power consumed by computer systems has led to power management strategies that shut down or turn off various devices and features of the computer system via hardware or software mechanisms when the computer system is not in use. An example of one power management strategy is the ADVANCED POWER MANAGEMENT (APM) Interface Specification, developed by INTEL™ and MICROSOFT™. Another is the ADVANCED CONFIGURATION AND POWER INTERFACE (ACPI) specification by INTEL™, MICROSOFT™, and TOSHIBA™. These specifications define power states at which the computer system may reside. The power states of a power management strategy typically range from the highest state, where the computer system is operating normally in an on power state such as where the computer system can process data, to the lowest state where the computer system is completely turned off. Various devices of the computer system are shut down and the system processor may not perform computations at lower intermediate power states. Such intermediate power states include the Standby, Suspend, and Hibernation power states for the APM specification and the Sleeping and Soft-off power states for ACPI specification.

Computer systems typically include computer busses that allow for the intercoupling of computer system devices such as peripheral devices, system processors, and memory. One type of computer bus is a computer bus conforming to the PCI Local bus standard, rev. 2.2 (PCI rev. 2.2 standard). Computer busses such as those conforming to the PCI rev 2.2 standard may include computer card slots for receiving computer cards having circuitry allowing for computer devices, located on the card, to be added to the computer system.

Installing a computer card with a computer system in an on power state can cause serious damage to the computer system and to the computer card circuit. During installation, a computer card may be "rocked" into a card slot connector wherein some pins of the computer card may contact corresponding slot connector pins before other pins of the computer card contact their corresponding slot connector pins. Such a situation may momentarily leave a card device ungrounded while receiving power. Another problem is that pins of the computer card may inadvertently contact non corresponding pins of the card slot connector. Consequently, power pins of the slot connector may be connected to signal lines of the device and vice versa. Accordingly, computer systems are typically in a power state where power is removed from the slot connector before a computer card is installed.

The PCI rev. 2.2 standard specifies a power management event (PME#) power management signal that allows a device connected to the bus to send a request to change the power state of the computer system such as to place the computer system in a working power state from another power state such as a sleeping power state or soft-off power state. An example of a circuit configuration utilizing the PME# signal is shown in FIG. 10 of the PCI BUS POWER MANAGEMENT INTERFACE SPECIFICATION, Revision 1.1 and described in the text associated with the Figure. The PCI rev. 2.2 standard also specifies an auxiliary power signal referred to as 3.3 Vaux signal. The 3.3 Vaux signal is active even when the computer system is in a soft-off power state or in a sleeping power state. Because pins of a card and a card slot connector may become cross-connected during installation, inserting a PCI rev. 2.2 compliant computer card into a corresponding PCI rev. 2.2 compliant card slot during a sleeping power state may cause a computer system to change power states due to pins of the computer card shorting a grounded pin of the card slot connector with the PME# signal pin of the card slot connector. Having a computer system change power states due to the insertion of a computer card may lead to customer complaints or damage to the computer card circuit or computer system.

SUMMARY

It has been discovered that preventing a computer system from transitioning to a higher power state from a lower power state when a computer system chassis is open advantageously prevents a computer system from inadvertently transitioning to an on power state from a lower power state during the operable coupling of a computer card circuit to a computer bus.

In one aspect of the disclosure invention, a computer system includes at least one connector. Each connector is configured to be coupled to a respective computer card circuit to provide a power management signal from the computer card circuit indicating a request to change a power state of the computer system. The computer system also includes a chassis detection circuit having an output to provide an indication signal of whether a chassis of the computer system is open or closed. The computer system further includes a gating circuit operably coupled to the chassis detection circuit to receive the indication signal from the chassis detection circuit and operably coupled to the at least one connector. The gating circuit has an output selectively provide, as determined by the indication signal, a gated power management signal to initiate the placement of the computer system in a higher power state from a lower power state is response to receiving a power management signal from the at least one connector. The gating circuit provides the gated power management signal when the indication signal indicates that the chassis is closed. The gating circuit does not provide the gated power management signal when the indication signal indicates that the chassis open.

In another aspect, the invention includes a method for controlling a change in a power state of a computer system.

The method includes receiving a request signal from a computer card circuit connector to change the power state of a computer system and determining whether the chassis is open or closed. The method also includes preventing the request signal from placing the computer system in a higher power state if the chassis is determined to the open.

In another aspect of the invention, a computer system includes a chassis detection circuit having an output to provide an indication signal of whether a chassis of the computer system is open or closed. The computer system also includes means for preventing a power management signal provided by a computer card circuit connector from changing a power state of the computer system to a higher power state from a lower power state when the indication signal indicates that the chassis is open.

In another aspect of the disclosure, a computer system includes at least one computer bus and a plurality of computer devices. Each computer device is operably coupled to one of the at least one computer bus, and each computer device has an output to provide a power management signal to change a power state of the computer system. The computer system also includes a chassis detection circuit having an output to provide an indication signal of whether a chassis of the computer system is open or closed and a gating circuit coupled to the outputs of the plurality of computer devices to receive the power management signals coupled to the chassis detection circuit to receive the indication signal. The gating circuit has an output to provide a gated power management signal to initiate a change in the power state of the computer system in response to receiving a power management signal from one of the computer devices. The gating circuit does not provide the gated power management signal to change the power state of the computer system to a higher power state from a lower power state when the indication signal indicates that the chassis is open.

In another aspect of the disclosure, a computer system includes a chassis detection circuit having an output to provide an indication signal of whether a chassis of the computer system is open or closed. The computer system also includes a gating circuit operably coupled to the chassis detection circuit to receive the indication signal from the chassis detection circuit. The gating circuit has at least one input to receive a PME# signal. The gating circuit has an output to selectively provide, as determined by the indication signal, a gated power management signal to initiate the placement of the computer system in a higher power state from a lower power state in response to receiving a PME# signal. The gating circuit provides the gated power management signal when the indication signal indicates that the chassis is closed. The gating circuit does not provide the gated power management signal when the indication signal indicates that the chassis open.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different indicates identical items unless otherwise noted.

DETAILED DESCRIPTION

Figure 1:
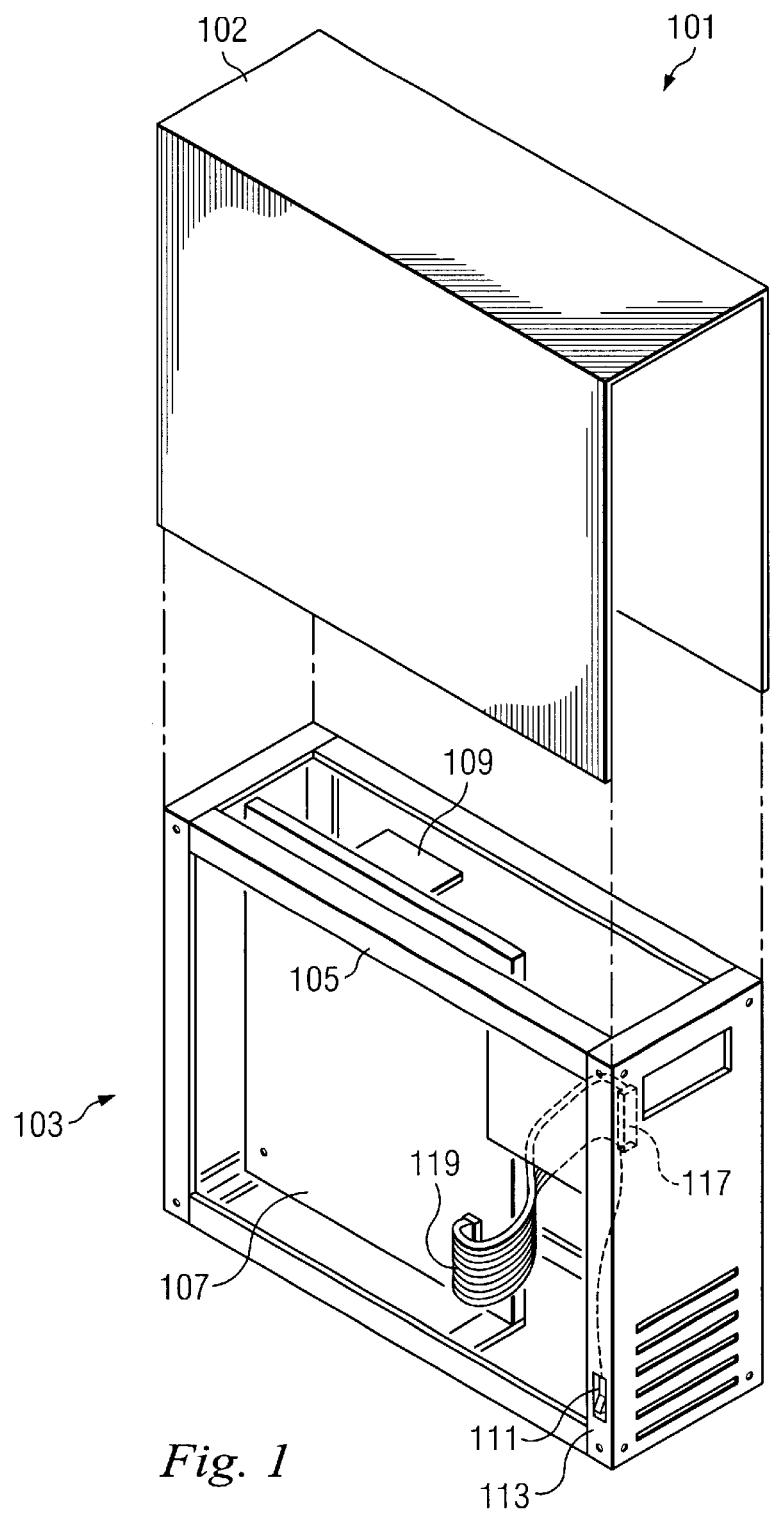
FIG. 1 is a perspective view of one example of a computer system.

FIG. 1 is a perspective view of a computer system according to the present disclosure. Computer system 101 is a computer system server implemented in a tower configuration. In FIG. 1, the chassis 103 of computer system 101 is open in that internal components of computer system 101 such as system board 107 and devices mounted thereon are exposed and accessible due to cover 102 being removed from the chassis frame 105. A chassis intrusion switch 111 is mounted to a frame member 113 of chassis frame 105. Switch 111 has two switch states. One switch state indicates that chassis 103 is open such as, for example, where cover 102 has been removed from frame 105, as shown in FIG. 1. The second switch state indicates that chassis 103 is closed such as where cover 102 properly resides over frame 105. Switch 111 is electrically coupled to circuitry on system board 107 via a control board 117 and multi-conductor cable 119. Control board 117 receives and provides other signals such as an LED signal to an LED (not shown) mounted on an outer panel. Computer system 101 includes a gating circuit (e.g., item 281 of FIG. 2) that prevents specific computer devices and computer card circuits housed in chassis 103 from placing computer system 101 in an on power state (such as, e.g., a working power state) from a lower power state when computer system chassis 103 is open as indicated by switch 111. One example of a computer system is the PRECISION WORKSTATION 620 sold by the DELL COMPUTER CORP.

Shown in FIG. 1 is a computer card 109 physically coupled to system board 107. A computer card typically includes circuitry that is mounted to the computer card such as a computer device. A computer card is sometimes referred to a daughter card, a daughter board, an extension board or card, an adapter card, or an add-in card. The circuit mounted on the computer card is typically coupled to the computer system via a computer bus (not shown in FIG. 1) and/or via side band signal wires. Computer cards provide a computer system with flexibility to change or upgrade devices and to add new devices. Examples of conventional computer card circuits typically mounted on computer cards include modems, audio card circuits, network connection circuits, video card circuits, system processors, storage devices, and RAM circuits. However, other types of conventional computer system devices may also be located on computer cards.

Computer system 101 implements a power management strategy to reduce power consumption during periods of reduced activity. In one embodiment, computer system 101 implements the ADVANCED CONFIGURATION AND POWER INTERFACE (ACPI) specification. Under the ACPI specification, computer system 101 may exist at one of four global power states. The four global power states, from the highest to the lowest, are a working power state (G0) (also referred to as the S0 power state), a sleeping power state (G1), a soft-off power state (G2) (also referred to as the S5 power state), and a mechanical off power state (G3). The global sleeping power state (G1) is subdivided into four sleeping power states, (in order from highest to lowest): S1 sleeping state, S2 sleeping state, S3 sleeping state, and S4 sleeping state. In the working power state, the computer system dispatches and executes user mode (application) threads. Also in the working power state, the power states of the peripheral devices may dynamically change. In the sleeping power states, user mode threads are typically not executed. The sleeping power states are differentiated by differences in various attributes such as wake up latency, power availability, and data retention of various computer devices. In the soft-off power state, a computer system consumes a minimal amount of power with an auxiliary power source operating to supply auxiliary power. Typically, a computer system is rebooted to return to the working power state from the soft-off power state. The mechanical off power state is typically equivalent to unplugging a computer system. Some computer systems that implement the ACPI specification may not support all power states of the ACPI specification. For example, with some computer systems, the S2 sleeping power state is not supported.

Several events may cause computer system 101 to change power states from a lower power state to the working power state (or other "on" power states for other power management strategies). For example, a user pushing a front panel button (not shown) typically causes computer system 101 to transition from the soft-off power state to the working power state. In addition, devices of computer system 101 may also generate signals which would cause computer system 101 to transition to a working power state. For example, computer system 101 may transition to a working power state in response to a real time clock (RTC) wakeup signal from an RTC circuit (not shown) mounted on system board 107. In addition, computer system 101 also includes a remote access circuit (not shown) located on a computer card (not shown) that generates a wakeup signal in response to receiving a wakeup signal from remote devices (such as a remote computer system) via a computer network (e.g., a local area network or a wide area network).

Figure 2:
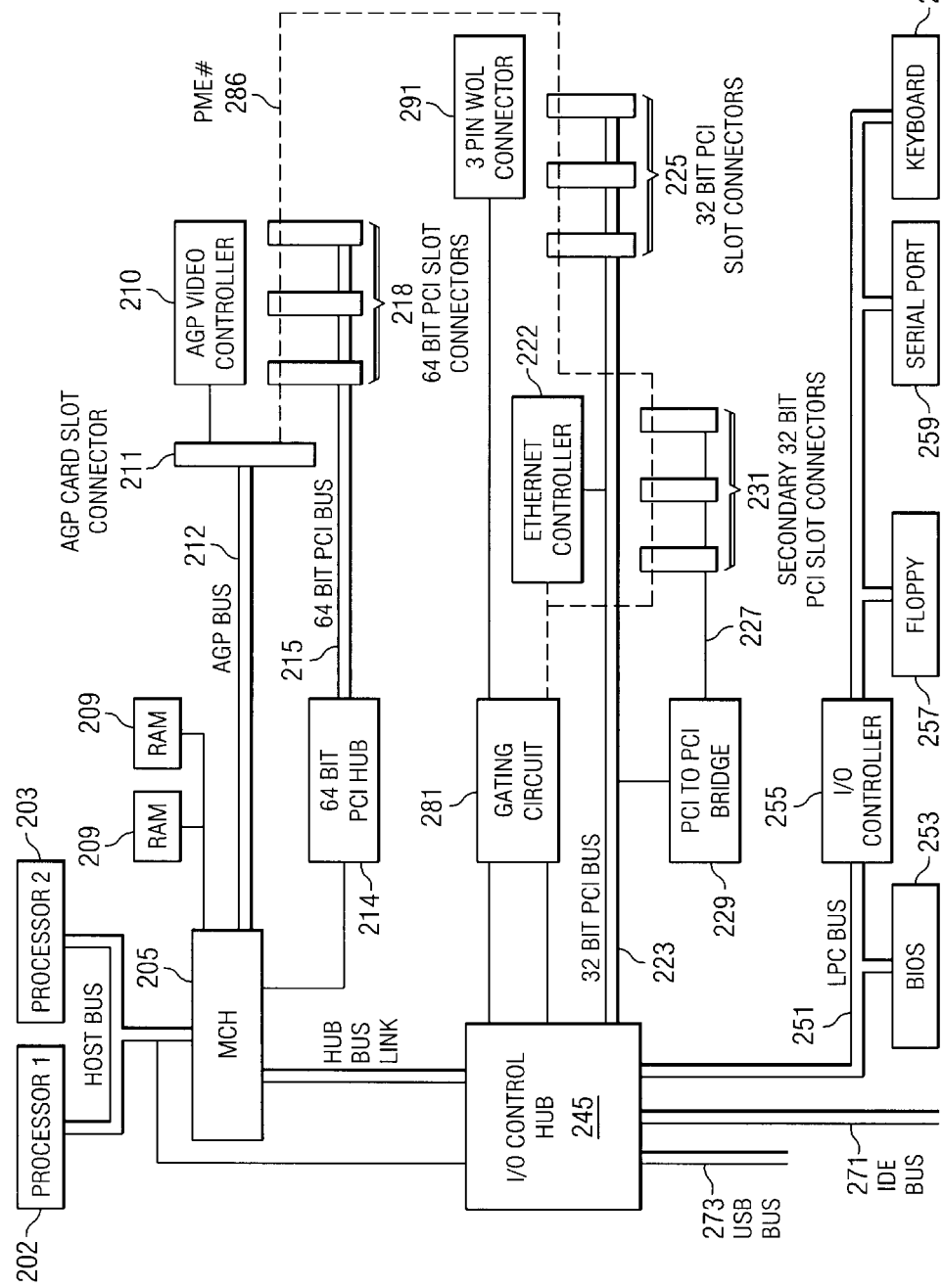
FIG. 2 is a block diagram of one example of a computer system.

FIG. 2 is a block diagram of computer system 101. Computer system 101 includes two system processors 202 and 203 such as, e.g., the PENTIUM III processor sold by INTEL™. RAM 209 is operably coupled to systems processors 202 and 203 via a memory hub controller (MCH) 205 which in one embodiment is implemented with the 440BX chipset sold by INTEL™. A video controller 210 conforming to the Advanced Graphics Port Specification (AGP video controller) is mounted on a computer card (not shown) that is inserted into an AGP card slot connector 211 which is operably coupled to memory control hub 205 via AGP bus 212.

Computer system 101 includes a number of other computer busses conforming to various computer bus standards that enable system processors 202 and 203 and memory 209 to be coupled to multiple computer devices. Computer bus 215 is a 64 bit computer bus conforming to the Peripheral Component Interface (PCI) standard. 64 bit PCI card slot connectors 218 are located on computer bus 215 and are operably coupled to memory controller hub 205 via a 64 bit PCI hub 214. Computer bus 223 is a 32 bit computer bus conforming to the PCI specification. Located on PCI computer bus 223 are PCI card slot connectors 225 and an ethernet controller 222 which is mounted on system board 107. Computer bus 223 is operably coupled to system processors 202 and 203 via I/O control hub 245. In one example, I/O control hub 245 is implemented with a PIIX4 chip sold by INTEL™. Computer system 101 also includes a secondary 32 bit PCI computer bus 227 operably coupled to computer bus 223 via a PCI-to-PCI bridge 229 with 32 bit PCI card slots 231 located on secondary bus 227. Several computer devices (not shown) are operably coupled to PCI busses 215, 223, and 227 including devices (not shown) located on computer cards inserted into card slot connectors 218, 225, and 231. Such devices include remote access circuits such as LAN connector circuits, modem circuits, and sound card circuits. Other devices operably coupled to computer system 101 via PCI computer busses 215, 223, and 227 include hard disk drives (not shown) operably coupled to a PCI computer bus via a SCSI controller (not shown). Other conventional computer devices (not shown) maybe coupled via the PCI busses 215, 223, and 227 and may be located either on computer cards or mounted to system board 107.

Computer system 101 also includes computer bus 251 which conforms to the Low Pin Count (LPC) bus standard. LPC computer bus 251 is operably coupled to computer system 101 via I/O control hub 245. Operably coupled to LPC computer bus 251 are BIOS ROM 253 and I/O controller 255. Operably coupled to the I/O controller 255 are a floppy disk drive 257, a serial port 259, and a keyboard 261 located externally to chassis 103. Computer system 101 also includes a computer bus 271 conforming to the Integrated Drive Electronics (IDE) standard and a computer bus 273 conforming to the Universal Serial Bus (USB) standard.

Card slot connectors 211, 218, 225, and 231 each include a PME# terminal (not shown) for providing a PME# signal generated by the card circuit (not shown) located on a computer card that is inserted into a respective card slot connector. The ethernet controller 222 also includes a PME# terminal for providing a PME# signal. The PME# terminals for each of the card slot connectors 211, 218, 225, and 231 and for ethernet controller 222 are electrically coupled together in a wired-OR configuration to an input of gating circuit 281 (as indicated by dash line 286). Gating circuit 281 also has an input for receiving a wakeup signal from a 3 pin wake on LAN (WOL) connector 291. With other computer systems, other devices mounted to the system board may also include PME# terminals that are connected to gating circuit 281.

Card slot connectors 211, 218, 225, and 231 are mounted on system board 107. With other computer systems, the card slot connectors are mounted to riser cards that are mounted on the system board. Card slots connectors 211, 218, 225, and 231 may be either +3.3 V or +5 V connectors.

Figure 3:
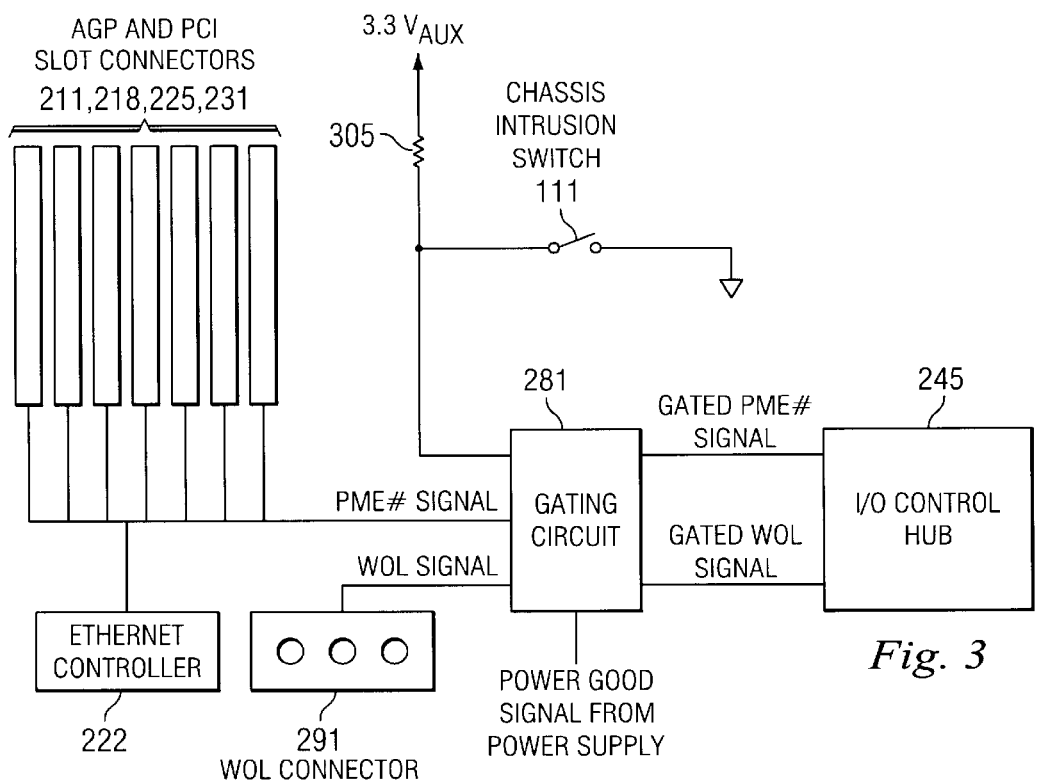
FIG. 3 is a block diagram illustrating a coupling of a gating circuit in a computer system.

FIG. 3 is a block diagram further illustrating the coupling of gating circuit 281 in computer system 101. When chassis 103 is open as indicated by switch 111, gating circuit 281 prevents I/O control hub 245 from receiving a PME# signal generated by any device (either operably coupled to computer system 101 via AGP card slot connector 211 or via PCI card slot connectors 218, 225, and 231 or system board mounted such as ethernet controller 222) to place computer system 101 in on power state (such as the working power state with the ACPI standard) from a lower power state. If chassis 103 is closed, however, gating circuit 281 provides a gated PME# signal to I/O control hub 245 in response to receiving a PME# signal from one of the slot connectors 211, 218, 225, and 231 or from ethernet controller 222 to place computer system 101 in a working power state from a lower power state. Switch 111 is electrically coupled to a 3.3 Vaux power supply via pull up resistor 305.

Gating circuit 281 also prevents I/O control hub 245 from receiving a wakeup signal from a wake on LAN (WOL) circuit (not shown) when chassis 103 is open. Gating circuit 281 receives the WOL signal from a WOL circuit via WOL connector 291 mounted on system board 107. WOL connector 291 is operably coupled via a jumper (not shown) to a WOL circuit (not shown) located on a computer card (not shown). The WOL circuit also receives power from computer system 101 via WOL connector 291. When chassis 103 is closed as indicated by switch 111, gating circuit 281 provides, a gated WOL signal to I/O control hub 245 in response to receiving a WOL signal to place the computer system in an on power state from a lower power state. When switch 111 indicates that chassis 103 is open, gating circuit 281 prevents I/O control hub 245 from receiving the gated WOL signal to place computer system 101 in an on power state from a lower power state.

In response to receiving either the gated PME# signal or the gated WOL signal from gating circuit 281, I/O control hub 245 initiates the placement of computer system 101 in a working power state. The operations that the I/O control hub 245 performs to initiate the placement of computer system 101 in the working power state depends upon which lower power state computer system 101 resides. For example, if computer system 101 is in the S1 or S2 sleeping power states, I/O control hub 245 generates an interrupt (e.g., a system management interrupt (SMI)), wherein the operating system of computer system 101 executes an interrupt routine to place computer system in the working power state after determining that the interrupt was generated in response to a PME# signal or WOL signal. If computer system 101 is in the S3–S5 power states, then I/O control hub 245 generates a PS_ON signal to the system power supply (not shown) to turn on all system voltages required for the working power state. Other operations for transitioning from a lower power state to a working power state are set forth in the ACPI specification. Those of skill in the art will appreciate that, based upon the teachings herein, numerous other techniques may be implemented for placing a computer system in an on power state from a lower power state in response to receiving a gated PME# signal or a gated WOL signal. For example, other controllers of computer system 101 may be utilized in changing the power state of computer system 101.

Because the PME# signal is also utilized to place computer system 101 in a lower power state from an on power state, it may be desirable to allow the PME# signal (and the WOL signal) to place computer system 101 in a lower power state from an on power state when chassis 103 is open. Accordingly, gating circuit 281 receives a power good signal from a power supply (not shown) located within computer system chassis 103. The power good signal indicates whether or not the computer system is in a powered up power state where all system power supply voltages are typically available. For computer system 101, such powered up power states include the working power state (G0) and sleeping power states S1 and S2. If computer system 101 is in a powered up power state, gating circuit 281 allows I/O controller hub 245 to receive either the PME# signal or the WOL signal to change the power state of computer system 101 (either to a higher power state or a lower power state) regardless of whether chassis 103 is open or closed as indicated by switch 111. Because higher sleeping states such as S1 and S2 are powered up power states, a PME# signal generated during these states will cause I/O control hub 245 to initiate the placement of computer system 101 in the working power state regardless of whether chassis 103 is open or closed as indicated by switch 111. However, with other computer systems, gating circuit 281 may receive other signals that are provided only when computer system 101 resides in the working power state. Thus, gating circuit 281 may be configured to allow the PME# signal or WOL signal to pass to I/O control hub 245 when chassis 103 is open only when computer system 101 is in the working power state.

Figure 4:
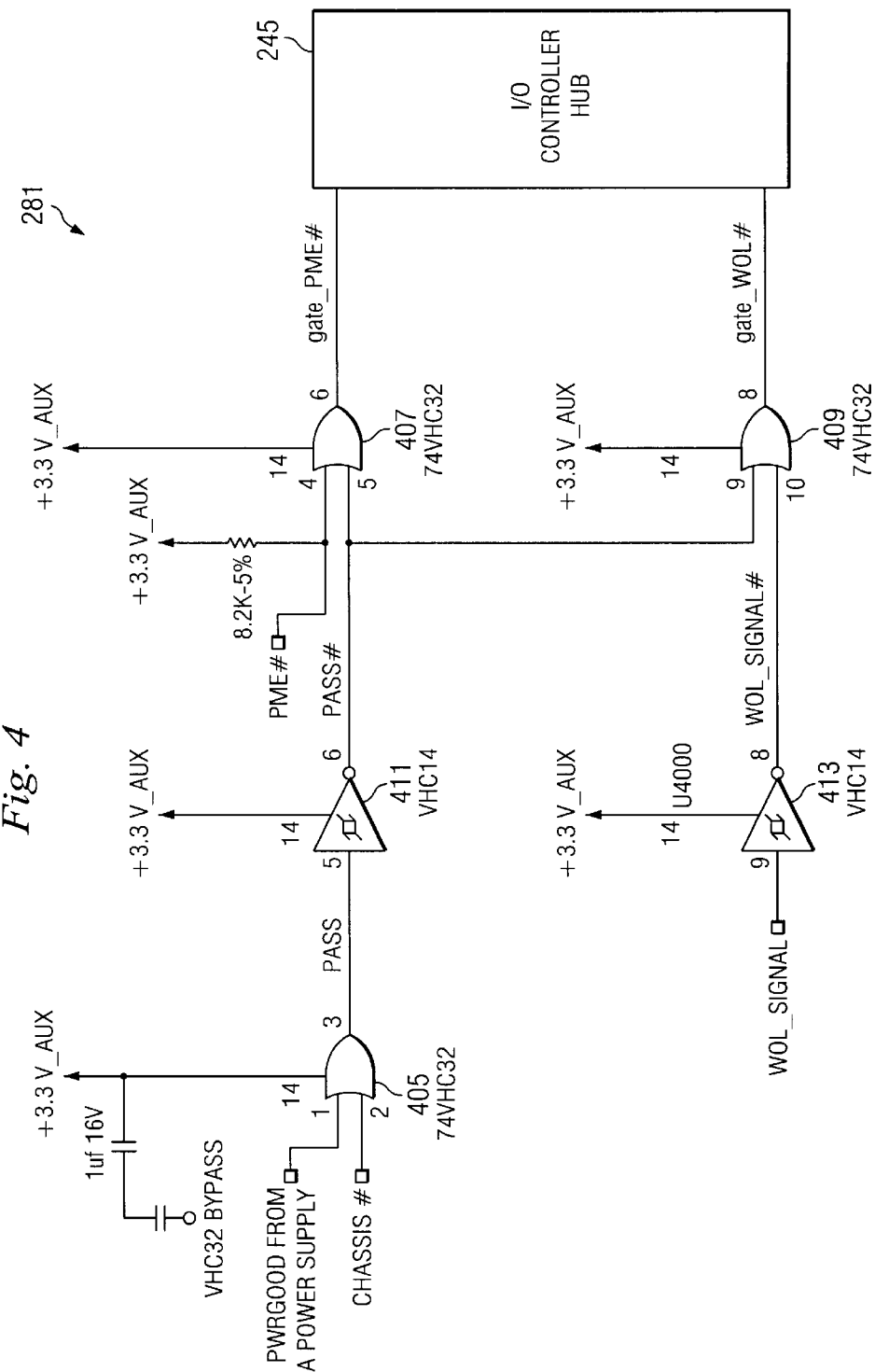
FIG. 4 is a circuit diagram of one example of a gating circuit.

FIG. 4 is a circuit diagram of gating circuit 281. Gating circuit 281 includes three OR gates 405, 407, and 409 and two inverter gates 411 and 413. OR gates 405, 407, and 409 are of an OR gate chip package (not shown) mounted on system board 107. The numbers shown adjacent to the inputs and outputs of OR gates 405, 407, and 409 are the pin numbers of the OR gate chip package. Inverter gates 411 and 413 are of an inverter gate package (not shown) mounted on system board 107. The pin numbers of the inverter gate chip package are shown adjacent to the inputs and outputs of inverter gates 411 and 413. The OR gate chip package and the inverter gate chip package are both powered by a +3.3V auxiliary power source (+3.3V_AUX) that supplies power when computer system 101 is in the sleeping power states and soft off power states so as to enable gate circuit 281 to operate when computer system 101 is in these power states.

Input pin 4 of OR gate 407 is electrically coupled to the PME# signal terminals (not shown) of card slot connectors 211, 218, 225, and 231 and of other system board mounted devices such as ethernet controller 222. A computer card circuit located on a card inserted into one of the card slot connectors (211, 218, 225, and 231) generates a PME# signal by grounding the PME# signal terminal of its corresponding card slot connector in which it is inserted to drive pin 4 of OR gate 407 to a low voltage level. All of the PME# terminals of the slot card connectors and system mounted board devices are electronically coupled to input 4 of OR gate 407. However, other gating circuits for other computer systems may include multiple inputs with each input connected to different card slot connector PME# terminal or system board mounted device PME# terminal wherein each of the multiple inputs would be NORed together.

OR gate 407 receives at one of its inputs (pin 1) a power good signal (PWRGOOD) from a power supply (not shown) of computer system 101. The PWRGOOD signal being at a high voltage level indicates that computer system 101 is in a powered up power state, and the PWRGOOD signal being at a low voltage level indicates that computer system 101 is at a lower, non powered up power state. OR gate 405 receives at its other input (pin 2) a signal (chassis#) from chassis switch 111 which at a high level indicates that chassis 103 is closed and at a low level indicates that chassis 103 is open. OR gate 405 provides at its output an asserted-high, pass signal (pass) that allows the PME# signal and the WOL signal to pass through OR gates 407 and 409, respectively, to I/O control hub 245 to change the power state of computer system 101. If chassis 103 is closed as indicated by the chassis# signal or if computer system 101 is in a powered up power state as indicated by the PWRGOOD signal, OR gate 405 provides the pass signal allowing I/O control hub 245 to receive the gate_PME# signal and the gate_WOL signal to change the power state of computer system 101. Consequently, gating circuit 281 only prevents I/O control hub 245 from receiving the PME# and WOL signals when the PWRGOOD signal indicates that computer system 101 is not in a powered up power state and the chassis# signal indicates that chassis 103 is open.

FIG. 4 shows one example of a gating circuit according to the present disclosure. Those of skill in the art will appreciate that, based upon the teachings herein, a gating circuit according to the present disclosure may be implemented in other ways, such as with other types of logic gates or other types of electronic circuit devices. For example, the circuit shown in FIG. 4 may be implemented in a single integrated programmable chip. Also, a gating circuit may be implemented in a multi-functional, programmable integrated chip such as I/O control hub 245.

A gating circuit according to the present disclosure may be implemented in computer systems that utilize other power management strategies such as, for example, the ADVANCE POWER MANAGEMENT (APM) specification.

With other computer systems, a chassis may be considered "open" if a door on the chassis is in an open position with respect to the chassis, wherein a chassis intrusion switch would indicate whether the door was in the open position and the gating circuit would prevent the PME# from initiating placement of the computer system in a higher power state.

Those of skill in the art will recognize that, based upon the teachings herein, several modifications may be made to the embodiments shown and described in the drawings and specification. For example, a gating circuit according to the present disclosure may be implemented in other types of computer systems including computer systems of other forms.

While particular embodiments of the present invention have been shown and described, it will be recognized to those skilled in the art that, based upon the teachings herein, further changes and modifications may be made without departing for this disclosure and its broader aspects, and thus, the appended claims are to encompass within their scope all such changes and modifications as are within the true spirit and scope of this invention.

What is claimed is:

1. A computer system comprising:

at least one connector, each connector configured to be coupled to a respective computer card circuit to provide a power management signal from the computer card circuit indicating a request to change a power state of the computer system;

a chassis detection circuit having an output to provide an indication signal of whether a chassis of the computer system is open or closed;

a gating circuit operably coupled to the chassis detection circuit to receive the indication signal from the chassis detection circuit and operably coupled to the at least one connector, the gating circuit having an output to selectively provide, as determined by the indication signal, a gated power management signal to initiate the placement of the computer system in a higher power state from a lower power state in response to receiving a power management signal from the at least one connector, wherein the gating circuit provides a gated power management signal when the indication signal indicates that the chassis is closed, wherein the gating circuit does not provide the gated power management signal when the indication signal indicates that the chassis is open;

the gating circuit including an input to receive a power state indication signal indicating that the computer system is in a powered up power state; and when the indication signal indicates that the computer system is in a powered up state, the gating circuit providing at its output a signal to initiate a change in the power state of the computer system in response to receiving a power management signal from the at least one connector regardless of whether the indication signal of the chassis detection circuit indicates whether the chassis is open or closed.

2. The computer system of claim 1 wherein the at least one connector includes:

at least one card slot connector operably coupled to a computer bus of the computer system, each card slot connector capable of receiving a respective computer card, each of the at least one card slot connector capable of providing a power management signal from a computer card circuit of the respective computer card.

3. The computer system of claim 2 wherein a first group of the at least one card slot connector substantially conform to a peripheral component interface (PCI) standard.

4. The computer system of claim 1 wherein:

the at least one connector includes a plurality of connectors;

each connector of the plurality includes a terminal for providing the power management signal from a respective computer card circuit; and each of the terminals for providing the power management signal are electrically coupled together in a wired-ORed configuration and are electrically coupled to an input of the gating circuit.

5. The computer system of claim 1 further comprising:

a controller circuit capable of initiating the placement of the computer system in a higher power state in response to receiving the gated power management signal from the gating circuit.

6. The computer system of claim 1 wherein the power management signal includes a Power Management Event (PME#) signal.

7. The computer system of claim 1 wherein the lower power state is a non powered up power state.

8. The computer system of claim 1 wherein the chassis detection circuit includes a chassis intrusion switch located on a frame member of the chassis, the chassis further including an outer cover having at least one outer panel, the intrusion switch being at a first switch state indicating that the chassis is closed when the cover is properly positioned on the frame member of the chassis, the intrusion switch being at a second switch state indicating that the chassis is open when the cover is removed from the frame member.

9. The computer system of claim 1 wherein the at least one connector is coupled to a computer card circuit of a computer card via a jumper and receives a power management signal from the computer card circuit via the jumper.

10. The computer system of claim 1 further comprising:

a computer card circuit coupled to one of the at least one connectors, the computer card circuit including circuitry to receive a wake on LAN (WOL) signal from a remote device and provide a power management signal in response to the receipt of the WOL signal.

11. The computer system of claim 1 wherein one of the connectors is coupled to a computer card circuit configured to receive signals from a remote device, the computer card circuit generates a power management signal in response to receiving from the remote device a signal to change the power state of the computer system.

12. The computer system of claim 1 wherein the lower power state is a soft off power state.

13. The computer system of claim 1 wherein the computer system implements a power management strategy based upon an Advanced Configuration and Power Interface (ACPI) standard.

14. The computer system of claim 1 wherein the higher power state is an on power state.

15. The computer system of claim 14 wherein the on power state is a working power state.

16. The computer system of claim 1 further comprising:

a computer device mounted on a system board of the computer system, the computer device coupled to the gating circuit to provide a power management signal to request a change in the power state of the computer system, wherein the gating circuit selectively provides, as determined by the indication signal, a gated power management signal to initiate the placement of the computer system in a higher power state from a lower power state in response to receiving a power management signal from the computer device, wherein the gating circuit provides the gated power management signal when the indication signal indicates that the chassis is closed, wherein the gating circuit does not provide the gated power management signal when the indication signal indicates that the chassis is open.

17. A method for controlling a change in a power state of a computer system, the method comprising:

receiving a request signal from a computer card circuit connector to change the power state of a computer system;

determining whether the chassis is open or closed;

preventing the request signal from placing the computer system in a higher power state from a lower power state if the chassis is determined to be open; and changing the power state of the computer system in response to receiving the request signal to change the power state of the computer system when the computer system is in a powered up power state regardless of the determination of whether the chassis is open or closed.

18. The method of claim 17 further comprising:

placing the computer system in a higher power state from a lower state in response to the request signal if the chassis is determined to be closed.

19. The method of claim 17 further comprising:

receiving by a computer card circuit operably connected to the computer card circuit connector a request from a remote device to change the power state of the computer system; and providing by the computer card circuit via the computer card circuit connector a request signal to change the power state of the computer system in response to receiving the request from the remote device.

20. The method of claim 17 wherein:

the lower power state is a non powered up power state.

21. The method of claim 17 wherein the request signal includes a PME# signal.

22. A computer system comprising:

a chassis detection circuit having an output to provide an indication signal of whether a chassis of the computer system is open or closed;

means for preventing a power management signal provided by a computer card circuit connector from changing a power state of the computer system to a higher power state from a lower power state when the indication signal indicates that the chassis is open;

the means for preventing including an input to receive a power state indication signal indicating that the computer system is in a powered up power state; and when the indication signal indicates that the computer system is in a powered up power state, the means for preventing providing at an output a signal to initiate a change in the power state of the computer system in response to receiving a power management signal from a computer card connector circuit regardless of whether the indication signal of the chassis detection circuit indicates whether the chassis is open or closed.

23. The computer system of claim 22 wherein the computer card circuit connector is connected to a computer card circuit via a jumper.

24. The computer system of claim 22 further comprising:

at least one computer card slot connector, each computer card slot connector coupled to a computer bus and capable of receiving a respective computer card, each computer card slot connector operably coupled to the means for preventing to provide to the means for preventing a power management signal generated by a respective computer card circuit located on a respective computer card.

25. The computer system of claim 24 wherein the lower power state is a soft off power state.

26. The computer system of claim 22 wherein the power management signal includes a Power Management Even (PME#) signal.

27. The computer system of claim 22 wherein the chassis detection circuit includes a chassis intrusion switch located on a frame member of the chassis, the chassis further including an outer cover having at least one outer panel, the intrusion switch being at a first switch state indicating that the chassis is closed when the cover is properly positioned on the frame member of the chassis, the intrusion switch being at a second switch state indicating that the chassis is open when the cover is removed from the frame member.

28. The computer system of claim 22 wherein the higher power state is an on power state.

29. The computer system of claim 22 wherein the lower power state is a non powered up power state.

30. A computer system comprising:

at least one computer bus;

a plurality of computer devices, each computer device is operably coupled to one of the at least one computer bus, each computer device has an output to provide a power management signal to change a power state of the computer system;

a chassis detection circuit having an output to provide an indication signal of whether a chassis of the computer system is open or closed;

a gating circuit coupled to the outputs of the plurality of computer devices to receive the power management signals and coupled to the chassis detection circuit to receive the indication signal, the gating circuit having an output to provide a gated power management signal to initiate a change in the power state of the computer system in response to receiving a power management signal from one of the computer devices, wherein the gating circuit does not provide the gated power management signal to change the power state of the computer system to a higher power state from a lower power state when the indication signal indicates that the chassis is open;

the gating circuit including an input to receive a power state indication signal indicating that the computer system is in a powered up power state; and when the indication signal indicates that the computer system is in a powered up state, the gating circuit providing the sated power signal to change the power state of the computer system in response to receiving a power management signal regardless of whether the indication signal of the chassis detection circuit indicates whether the chassis is open or closed.

31. The computer system of claim 30 wherein at least one of the at least one computer bus substantially conforms to a Peripheral Component Interface (PCI) standard.

32. The computer system of claim 30 wherein:

each of the outputs for providing the power management signal are electrically coupled together in a wired- ORed configuration and are electrically coupled to an input of the gating circuit.

33. The computer system of claim 33 wherein the power management signal provided by the computer devices includes a Power Management Even (PME#) signal.

34. The computer system of claim 30 further wherein:
one computer device of the plurality of computer devices is configured to receive a remote request to change the power state of the computer system, the one computer device generates a power management signal in response to receiving the remote request.

35. The computer system of claim 30 wherein the lower power state is a non powered up power state.

36. The computer system of claims 30 wherein the computer system implements a power management strategy based upon an Advanced Configuration and Power Interface (ACPI) standard, wherein an S1 sleeping power state is a powered up power state.

37. The computer system of claim 30 wherein:
each of a first group of the plurality of computer devices is mounted on a computer card inserted into a slot connector connected to one of the computer busses.

38. The computer system of claim 30 wherein the computer system implements a power management strategy based upon an Advanced Configuration and Power Interface (ACPI) standard.

39. A computer system comprising:
a chassis detection circuit having an output to provide an indication signal of whether a chassis of the computer system is open or closed;
a gating circuit operably coupled to the chassis detection circuit to receive the indication signal from the chassis detection circuit, the gating circuit having at least one input to receive a PME# signal, the gating circuit having an output to selectively provide, as determined by the indication signal, a gated power management signal to initiate the placement of the computer system in a higher power state from a lower power state in response to receiving a PME# signal, wherein the gating circuit provides the gated power management signal when the indication signal indicates that the chassis is closed, wherein the gating circuit does not provide the gated power management signal when the indication signal indicates that the chassis is open; the gating circuit including an input to receive a power state indication signal indicating that the computer system is in a powered up power state; and when the indication signal indicates that the computer system is in a powered up power state, the gating circuit providing at its output a signal to initiate a change in the power state of the computer system in response to receiving a PME# signal regardless of whether the indication signal of the chassis detection circuit indicates whether the chassis is open or closed.

40. The computer system of claim 39 further comprising:
at least one connector, each connector including a PME# terminal electrically coupled to one of the at least one input of the gating circuit, each connector is configured to be coupled to a respective computer card circuit to provide a PME# signal from the computer card circuit via the PME# terminal; and at least one device mounted on a system board of the computer system, each device having a PME# terminal electrically coupled to one of the at least one input of the gating circuit for providing a PME# signal generated by the at least one device.

41. A computer system comprising:
means for receiving a request signal from a computer card circuit connector to change the power state of a computer system;

means for determining whether a chassis of the computer system is open or closed;

means for preventing the request signal from placing the computer system in a higher power state from a lower power state if the chassis is determined to be open; and means for changing the power state of the computer system in response to receiving the request signal to change the power state of the computer system when the computer system is in a powered up power state regardless of the determination of whether the chassis is open or closed.

* * * * *